(12) United States Patent
Sintov

(10) Patent No.: US 7,557,986 B2
(45) Date of Patent: Jul. 7, 2009

(54) HIGH POWER FIBER AMPLIFIER

(75) Inventor: Yoav Sintov, Petach Tikva (IL)

(73) Assignee: Soreq Nuclear Research Center, Nahal Soreq, Yavne (IL)

( * ) Notice: Subject to any disclaimer, the term of this patent is extended or adjusted under 35 U.S.C. 154(b) by 298 days.

(21) Appl. No.: 11/569,002

(22) PCT Filed: May 11, 2005

(86) PCT No.: PCT/IL2005/000503
§ 371 (c)(1),
(2), (4) Date: Nov. 13, 2006

(87) PCT Pub. No.: WO2005/112206
PCT Pub. Date: Nov. 24, 2005

(65) Prior Publication Data
US 2007/0229940 A1 Oct. 4, 2007

(51) Int. Cl.
H01S 3/00 (2006.01)
(52) U.S. Cl. .................................. 359/341.1
(58) Field of Classification Search ............. 359/341.1, 359/341.3; 372/6
See application file for complete search history.

(56) References Cited

U.S. PATENT DOCUMENTS 5,508,842 A * 4/1996 Takeda et al. ............. 359/341.1
5,778,129 A * 7/1998 Shukunami et al. ......... 385/127
5,930,030 A * 7/1999 Scifres ..................... 359/341.3
6,836,607 B2 * 12/2004 Dejneka et al. ............. 385/126
2002/0094159 A1 * 7/2002 Goldberg et al. ............. 385/27

FOREIGN PATENT DOCUMENTS

WO    WO 03/098295    11/2003

OTHER PUBLICATIONS

Okhotnikov Og et al, "Flared single-transverse-mode fibre amplifier" Electronics Letters, IEE Stevenage, GB, vol. 35, no. 12, Jun. 10, 1999, pp. 1011-1013.
Jaquean Y et al, "High Power Cladding-Pumped Er3+/Yb3+ Fiber Amplifiers etc.", Annals of Telecommunications, Presses Polytechniques et Universitaires, Romandes, Lausanne, CH, col. 58, No. 11/12, Nov. 2003, pp. 1640-1666.
Miyazaki T et al, "A High Power Nd-Doped Double-Clad Fiber Amplifier at 1.06 mum", Proceedings of the SPIE, SPIE, Bellingham, VA, US, vol. 2699, Jan. 30, 1996, pp. 254-265.

* cited by examiner

Primary Examiner—Mark Hellner
(74) Attorney, Agent, or Firm—Dekel Patent Ltd.; David Klein

(57) ABSTRACT

A high power fiber amplifier including a double clad fiber including a protective outer jacket (41), an outer clad (44), an inner clad (42, 35) and a doped core (43, 34, 32), and a source of pump power coupled to the inner clad through coupling optics (22) and at least one of a side-fiber coupling section and an end-fiber coupling section, wherein the inner clad includes a large diameter core portion (34), operative as a high power amplification stage, capable of absorbing the majority of the pump power, and a small diameter core portion (32), operative as a low power amplification stage, wherein both core portions, pumped through the inner clad (35), are serially connected through an optical interface point (37).

18 Claims, 2 Drawing Sheets

HIGH POWER FIBER AMPLIFIER

FIELD OF THE INVENTION

The present invention relates to high power fiber amplifiers, and methods and apparatus for achieving high energy pulses or CW (continuous wave) single frequency signals from high power fiber amplifiers, when low energy, low power source is utilized.

BACKGROUND OF THE INVENTION

High power fiber amplifiers have become increasingly popular due to their high efficiency, simplicity and reliability. In addition, they may be easily ruggedized, due to their simple arrangement.

High power applications generally use a double clad fiber. This fiber comprises a core, usually doped with a lasing material such as rare earth ions or other materials, an inner cladding encircling the doped core, through which the pump power flows and is gradually absorbed in the doped core, and an outer cladding encircling the inner cladding and forming a dielectric wave guide for the pump signal. The optical characteristics of the inner cladding closely match high power diode lasers, commonly used for solid-state laser pumping. Therefore, highly efficient pumping may be achieved by utilizing double clad fibers as a gain material.

Modern high power pumping techniques for commercial fiber lasers and amplifiers are usually based on end or side pumping by diode lasers. The common double clad fibers used for fiber lasers applications are $Yb^{3+}$ doped silica with tunable output between 980 nm-1200 nm (pumped by either 915 nm or 980 nm diodes), $Er^{3+}$ doped silica for 1550 nm eye-safe and communication applications (pumped by either 980 nm or 1480 nm diodes), and $Yb^{3+}$:$Er^{3+}$ silica fibers used also for 1550 nm applications, but in the high power range, where the wide spread erbium doped fibers are not applicable. Other fiber lasers used mostly for 2 μm remote sensing and medical applications are $Tm^{3+}$ doped and $Ho^{3+}$:$Tm^{3+}$ doped silica fibers.

The most commonly used fiber for marking, drilling and other industrial applications is the $Yb^{3+}$ fiber, characterized by high efficiency and robustness. In addition, reliable and efficient pump diodes are available for this ion excitation, while its wide absorption band (25 nm) allows using pump diodes that do not need active cooling by a Peltier effect element or liquid chiller. The fiber's high efficiency and high surface-to-volume ratio enables cooling by air rather than cumbersome liquid cooling in solid-state lasers.

Previously, much of the work done on erbium-doped fiber amplifiers has concentrated on maximizing the small signal optical gain, which in turn requires a small "spot size" or mode-field diameter (MFD). This also provides single mode operation considered desirable in applications requiring a high beam quality, communication applications and applications requiring very short pulses [D. J. Richardson et al., "Fiber Laser Systems Shine Brightly", Laser Focus World, September 1997, pp. 87-96].

When a low energy pulsed source should be amplified to high energy pulses by a fiber amplifier, the core diameter of the fiber amplifier is limited to a minimum value, under which the fiber amplifier performance deteriorates. The core diameter reduction may cause elevated power density flow in the fiber, which may stimulate fiber damage or non-linear effects such as stimulated Raman or Brillouin scattering or Self Phase Modulation, which have deleterious effect on the amplified pulse.

In one example, the maximum tolerable peak power in 1 m of a single mode previous doped optical fiber is about 500 W.

Similar problems can also occur in CW lasers and amplifiers where nonlinear effects such as Brillouin scattering can limit the output power when operating with narrow line widths (e.g. <10 MHz). For 1 m of conventional fiber in CW operation the nonlinear threshold for Brillouin scattering is about 20 W.

A further restriction on the available output power from pulsed fiber is the energy storage capacity of the amplifying fiber. The high gain coefficients in conventional single mode fibers limit the energy that can be stored to about 30 μJ. On the other hand, by using a fiber with a high diameter core that supports multi-mode operation in which the deleterious effects are eliminated, a very low gain and high amplification threshold are achieved, yielding a very low efficiency amplifier. Furthermore, when multi-mode fiber is used, a poor beam quality is achieved, which is unsuitable for applications demanding single mode or alternatively, near diffraction limited beam.

High energy pulses or high power CW single frequency (or alternatively, narrow line width) operation while keeping the beam quality close to the diffraction limit, has been achieved by various methods. U.S. Pat. No. 6,614,975 to Richardson, et al. uses special fiber arrangement for enlarging the core MFD so as to enable high energy pulses and CW single frequency, single mode amplification. U.S. Pat. No. 6,496,301 to Koplow, et al. induces single mode operation on multi-mode fibers by coiling the multimode gain fiber to induce significant bend loss for all but the lowest-order mode(s).

Reference is now made to FIG. 1, in which a prior art low energy source amplification in a high power fiber amplifier is illustrated. A high power diode 10 may pump optical power to a rare-earth doped double clad fiber 18 (e.g., $Yb^{3+}$ doped fiber), utilizing the previously mentioned methods for achieving single mode high power, high energy operation, through coupling optics 12 and an end-fiber coupling section 14. A seeder 16, such as a 1.064 μm diode, may inject low power (in case of CW single frequency operation) or low energy signals (in case of pulsed operation), to coupling section 14. Coupling section 14 may be coated for anti-reflection at the pump wavelength and may have high reflection at the signal wavelength. The double clad fiber 18 may be connected to output coupling optics 19.

However, when low energy source amplification is required, these methods are inadequate for achieving highly efficient amplification, due to the fact that the signal amplification threshold is high (mainly because of the high saturation energy and power, resulting from the high MFD, manifested by these methods) and the high noise evolution, mainly due to the Amplified Spontaneous Emission (ASE), resulting from the high population inversion and low efficiency signal amplification.

SUMMARY OF THE INVENTION

The present invention seeks to provide a simple, efficient and low cost high-power amplifier for low-power CW single frequency amplification and low energy pulsed source (referred to herein for short, "low power low energy").

The invention may comprise a composite core double clad fiber amplifier with a uniform size inner clad and different size cores along its length. From one side to a certain axial distance, the core diameter is small enough to support, but is not limited to, single mode operation. From that axial distance onwards, the core diameter is larger to enable efficient high energy high power, without the evolution of the nonlinear deleterious effects. Several amplification stages with gradually enlarged core diameter may be used, while the inner clad size may remain constant.

At the low power low energy source entrance, the fiber amplifier's core size may be small enough to enable efficient low noise amplification to power levels still lower than the previously mentioned deleterious effects evolution threshold. The next amplification stages with the enlarged core may also have, but not necessarily, lower Numerical Aperture (NA), which may provide further efficient amplification to high power CW single frequency or high energy pulse amplification, without the appearance of the non-linear deleterious effects. When a single mode source is used, high beam quality may be achieved due to the high beam quality of the source and the low mode coupling along the multi-mode amplification portions [M. E. Fermann, "Single mode excitation of multimode fibers with ultra short pulses", Optics Letters, Vol. 23, No. 1. 1998, pp. 52-54].

The homogeneous inner clad along the fiber length provides a continuous pump guiding from one side of the composite fiber to its other side while exciting the different fiber portions by the same pump sources.

The fiber amplifier of the present invention is much more efficient and produces less noise stemming from ASE and non-linear effects than the prior art, when amplification of low power CW single frequency source or low energy pulsed source is required.

BRIEF DESCRIPTION OF THE DRAWINGS

The present invention is herein described, by way of example only, with reference to the accompanying figures, wherein.

DETAILED DESCRIPTION OF EMBODIMENTS

Figure 1:
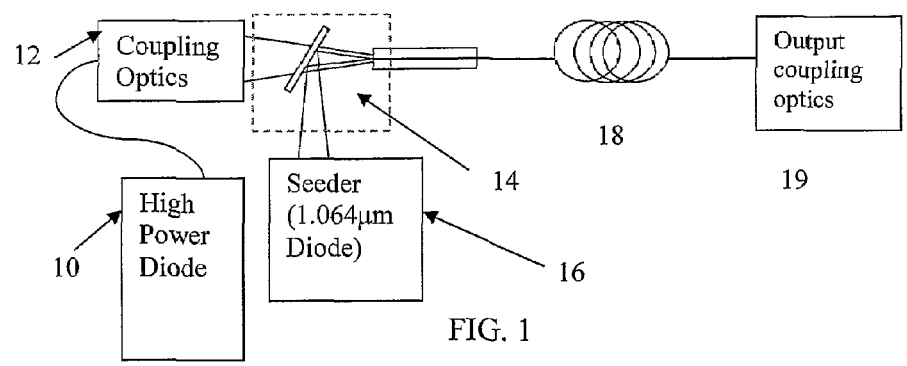
FIG. 1 is a simplified block diagram of a prior art high power fiber amplifier.
Figure 2:
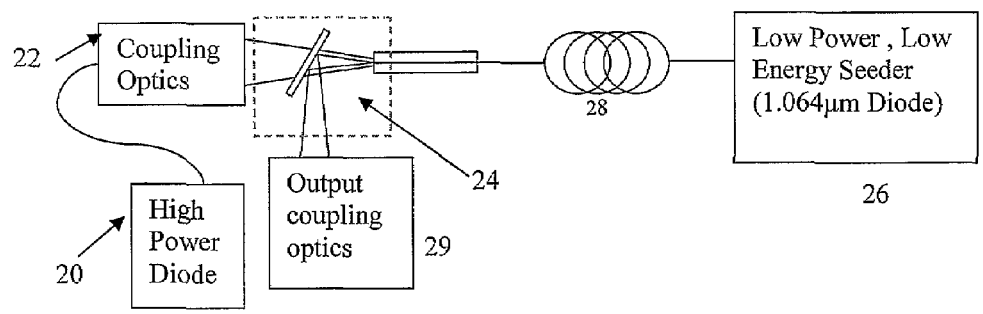
FIG. 2 is a simplified block diagram of a high power double clad fiber amplifier, constructed and operative in accordance with an embodiment of the present invention.

Reference is now made to FIG. 2, which illustrates a fiber amplifier for pulsed low energy source or low power single frequency CW source (low power, low energy source), such as, but not limited to, a laser diode 26. A high power laser diode 20 may pump optical power to a rare-earth doped composite double clad fiber 28.

Figure 4:
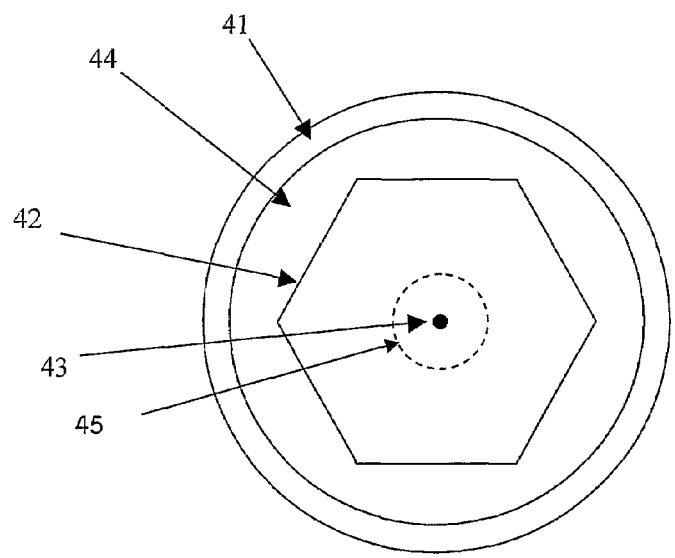
FIG. 4 is a simplified cross-sectional illustration of a hexagonal double clad fiber used in the high power fiber amplifier of FIG. 2, in accordance with an embodiment of the present invention.

The double clad fiber 28 cross section is shown in detail in FIG. 4. The double clad fiber may comprise, without limitation, a protective outer jacket 41, an outer clad 44, an inner clad 42 and a doped core 43, which may comprise a rare-earth doped core, such as but not limited to, $Yb^{3+}$ doped silica, $Er^{3+}$ doped silica, $Yb^{3+}:Er^{3+}$ doped silica, $Tm^{3+}$ doped silica and $Ho^{3+}:Tm^{3+}$ doped silica fibers, or any combination thereof. The doped core 43 may be a non-polarization-maintaining core or a polarization-maintaining core, according to the intended application requirements. Additional clad layers 45 may be added between the doped core 43 and inner clad 42, creating a multiple clad fiber. The inner clad 42 of the receiving fiber 40 may be non-symmetrical, which may help to reduce or eliminate helical modation, since these modes do not overlap with the doped core 43. The inner clad 42 may have a noncircular symmetrical shape, such as but not limited to, a rectangular, D-shape, hexagonal (this example being illustrated in FIG. 4), or any other shape (symmetrical or not).

The composite rear earth doped (e.g. $Yb^{3+}$ doped silica) double clad fiber 28 may comprise several amplification portions, each with different core diameter and common inner clad. Optical pumping is done through coupling optics 22, such as but not limited to, an end-fiber coupling section 24 or by side-coupling. Coupling section 24 may be coated for anti-reflection at the pump wavelength and may have high reflection at the output signal wavelength. The pump power travels along the entire composite fiber homogeneous inner clad, creating gain in all composite fiber portions. In the present embodiment, a single pump source is coupled to the inner clad of the composite double clad fiber through its end. However, when higher power is required, additional pump sources may be coupled through the other composite double clad fiber end or along its length, through side coupling techniques, familiar to those who are skilled in the art (see, for example, U.S. Pat. No. 5,999,673 to V. Gapontsev). A seeder 26, such as a 1.064 μm diode, may inject low power low energy signals to the input end of the composite rare earth doped fiber. The amplified signal may emerge from the other composite fiber end, which may be also the pump coupling end, and may be reflected by the end fiber coupling section 24 to output coupling optics 29, such as optical collimator or similar.

Figure 3:
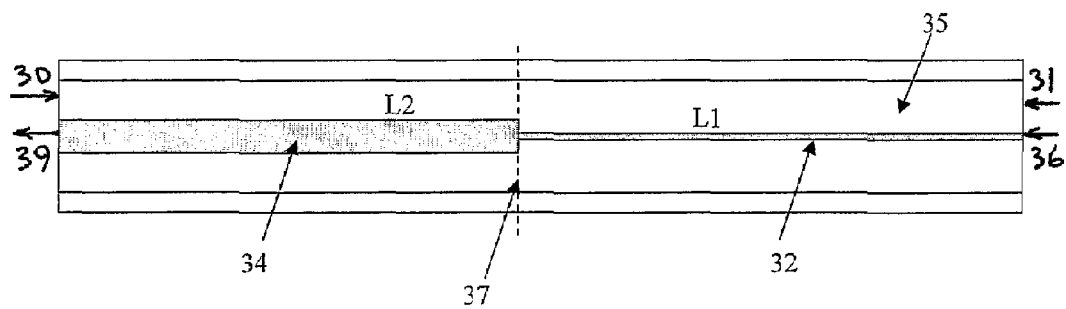
FIG. 3 is a simplified pictorial illustration of a composite fiber, comprising two portions with different core diameters, used in the fiber amplifier of FIG. 2, constructed and operative in accordance with an embodiment of the present invention.

Reference is now made to FIG. 3, which illustrates more detail of the composite rare earth doped double clad fiber 28 structure shown in FIG. 2, in accordance with an embodiment of the present invention. The pump power 30 may be launched (but not necessarily) through the inner clad of a large diameter core portion 34 (having length L2), gradually being absorbed by core portion 34, which may be doped. The residual pump power left at the interface between fiber portions 37 continues to travel along the inner clad of a small diameter core portion 32 (having length L1) of the composite fiber 28 and is gradually absorbed there. The major part of the pump power 30 may be absorbed by the large diameter core portion 34, which is used as the power amplification stage. The residual pump power at the interface 37 is sufficient to create gain in the small diameter core portion 32. Since the large diameter core portion 34 is used as a power amplifier, it is preferable to introduce the pump source through the end 30 of the large diameter core portion 34. However, if the pump power is not sufficient, then other pump sources may be introduced into the composite fiber inner clad through side coupling techniques (U.S. Pat. No. 5,999,673 to V. Gapontsev), or through the other composite double clad fiber end 31.

The composite fiber 28 in FIG. 3 may be created from two separate rare earth doped fibers, one with a small core, creating portion L1 and one with a large core, creating portion L2. The two fibers may have the same inner clad dimensions and may be optically connected at the interface point 37 by fusion splicing, optical bonding or any other method that enables minimum loss for both pump and signal.

The low power source signal, delivering CW single frequency signal or low energy pulsed signal, may be launched into the small diameter core portion 32, usually allowing only single mode operation. The low power signal may be efficiently amplified by portion 32, due to the relatively low saturation energy of the portion 32. As a result, a medium power signal is achieved at the interface point 37. The first portion ASE noise over length L1 is low, due to the efficient amplification of the low power low energy source signal at relatively low pump power levels at the small diameter core portion 32. The amplified signal of the first portion L1, even though higher than the source signal, is still lower than the threshold power of the non-linear deleterious effects. Therefore, the amplified signal at the interface point is clean of ASE noise and of non-linear phenomenon destructive effects.

The amplified signal at the interface point 37, even though lower than the required output signal, is high enough to saturate the large doped core 34 of the second portion L2 of the composite fiber 28. As a result, highly efficient amplification of the signal at the interface point 37 is achieved, yielding the required output power or pulse energy. The amplified signal at the second portion L2 output is still lower than the threshold of the non-linear deleterious effects, due to its large core 34. Moreover, the efficient amplification reduces the ASE noise that would appear if the source signal were encountered directly into the large diameter portion core 34. Therefore, the ASE noise level at both the second portion L2 end and the interface point 37, arising from the population inversion, is low. However, if the ASE noise of the second portion L2 at the interface point 37 were efficiently coupled to the first portion L1 core 32 through the interface point 37, even low ASE noise may deteriorate the amplification performance of the first portion L1. But since the ASE noise fills the entire second portion L2 core 34 transverse mode capacity, and the optical attachment of the two composite fiber 28 portions is non-adiabatic, only a minor portion of the second portion L2 ASE noise at the interface point 37 would be matched to the first portion L1 core 32. For example, if the first portion L1 core 32 diameter is 5 microns and the second portion L2 core 34 diameter is 30 microns and both cores have the same NA, then only 2.5% of the second portion L2 ASE noise leaks into the first portion L1 core 32.

On the other hand, the signal at the interface point 37, amplified by the first portion L1, occupies usually, although not necessarily, one mode only. As is well known to those skilled in the art, when a single mode signal enters a short (several meters) multimode fiber, mode coupling is negligible and the beam quality is closely maintained [M. E. Fermann, "Single mode excitation of multimode fibers with ultrashort pulses", Optics Letters, Vol. 23, No. 1. 1998, pp. 52-54. D. Gloge, "Optical power flow in multimode fibers", Bell Syst. Tech. J, Vol. 51, No. 8, 1972, pp. 1767-1783]. Moreover, since the core 34 of the second portion L2 fiber has gain properties, the basic transverse mode arriving from the first portion L1 saturates the second portion L2 core 34 and does not allow the evolution of higher order modes. Further assurance that the beam quality of the first portion L1 is sustained along the second portion L2, can be provided by using a Large Mode Area (LMA) fiber in the second portion L2 with its large core 34, providing the previously mentioned benefits for amplifying high energy pulses or CW single frequency signal and low NA for sustaining the beam quality, or alternatively, the single mode nature of the signal arriving from the first portion L1.

For example, in experiments using a pulsed source diode delivering 1 W peak power at 1064 nm wavelength and 200 nsec pulse duration at 5 kHz pulse repetition rate as input signal 36, with a composite $Yb^{3+}$ doped double clad fiber with two amplification portions, the first L1 with 6 micron/0.1 NA (Numerical Aperture) core 32 diameter and the second L2 with 30 micron/0.1 NA core 34 diameter, 120 W peak power and 600 mW average power were achieved at the amplifier output 39, without ASE noise and non-linear phenomenon effects. The composite fiber inner clad 35 shape was square, with 130 micron height. The inner clad 35 was pumped at the output end 30 by a 2 W 975 nm fiber coupled diode and at the input end 31 by 1 W 975 nm fiber coupled diode.

On the other hand, when only the second portion L2 fiber was used, with the same signal and pump arrangements, only 18 W peak power and 90 mW average power was achieved, exhibiting the benefit of using composite fiber for low power CW single frequency or low energy pulsed signal amplification.

Figure 5:
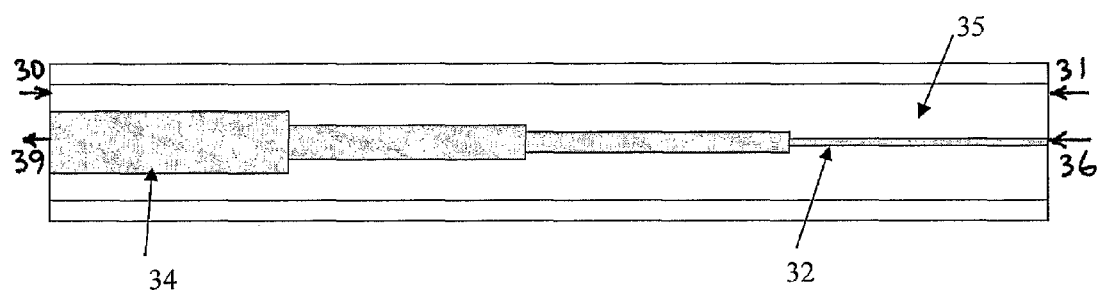
FIG. 5 is a simplified pictorial illustration of a composite fiber, comprising a plurality of portions with different core diameters, constructed and operative in accordance with another embodiment of the present invention.

Reference is now made to FIG. 5, which illustrates a composite double clad fiber with a plurality of fiber portions with different core diameters, constructed and operative in accordance with another embodiment of the present invention. The portion with the lowest core diameter 32 is near the signal input end 36, and the portion with highest core diameter 34 is near the output end 39. The composite fiber has an homogeneous inner clad 35 along all fiber portions and may be pumped by, without limitation, one or few pump sources 30 and/or 31, which may be coupled through the composite fiber ends, or by side-coupling along the respective length. Based on the same physical principle, the arrangement in FIG. 5 may provide even higher amplification than the dual portion amplifier in FIG. 3.

By using the composite double clad fiber of the present invention, high energy pulses or high power CW single frequency, with closely single transverse mode beam quality, can be achieved by efficient amplification of a low energy signal, without the appearance of deleterious non-linear effects such as Brillouin or Raman scattering or Self Phase Modulation and without unwanted noise arising from Amplified Spontaneous Emission (ASE).

The scope of the present invention includes both combinations and subcombinations of the features described hereinabove as well as modifications and variations thereof which would occur to a person of skill in the art upon reading the foregoing description and which are not in the prior art.

What is claimed is:

1. A high power fiber amplifier comprising:
   a double clad fiber comprising a protective outer jacket, an outer clad, an inner clad and a doped core; and
   a source of pump power coupled to the inner clad through coupling optics and at least one of a side-fiber coupling section and an end-fiber coupling section;
   wherein said inner clad comprises a large diameter core portion, operative as a high power amplification stage, capable of absorbing the majority of the pump power, and a small diameter core portion, operative as a low power amplification stage, wherein both core portions, pumped through the said inner clad, are serially connected through an optical interface point and wherein there is a step change in diameter between said small diameter core portion and said large diameter core portion at said optical interface point.

2. The amplifier according to claim 1, wherein said doped core comprises a rare-earth doped core.

3. The amplifier according to claim 2, wherein said rare-earth doped core comprises at least one of $Yb^{3+}$ doped silica, $Er^{3+}$ doped silica, $Yb^{3+}$:$Er^{3+}$ doped silica, $Tm^{3+}$ doped silica and $Ho^{3+}$:$Tm^{3+}$ doped silica fibers.

4. The amplifier according to claim 1, wherein said doped core is a non-polarization-maintaining core.

5. The amplifier according to claim 1, wherein said doped core is a polarization-maintaining core.

6. The amplifier according to claim 1, further comprising additional clad layers added between the doped core and the inner clad.

7. The amplifier according to claim 1, wherein said inner clad is non-symmetrical.

8. The amplifier according to claim 7, wherein said inner clad has a noncircular symmetrical shape.

9. The amplifier according to claim 1, wherein said inner clad of said small diameter core portion and large diameter core portion have the same dimensions.

10. The amplifier according to claim 1, wherein said inner clad of said small diameter core portion and large diameter core portions have different dimensions.

11. The amplifier according to claim 1, further comprising a seeder operative to inject low power low energy signals to an input end of said double clad fiber.

12. The amplifier according to claim 1, further comprising a seeder operative to inject low CW power single frequency signals to an input end of said double clad fiber.

13. The amplifier according to claim 1, wherein said large diameter core portion and said small diameter core portion are constructed from two separate rare earth doped double clad fibers optically connected at the interface by fusion splicing.

14. The amplifier according to claim 1, wherein said large diameter core portion and said small diameter core portion are constructed from two separate rare earth doped double clad fibers optically connected at the interface by optical bonding.

15. The amplifier according to claim 10, wherein said double clad fiber comprises a composite double clad fiber including a plurality of fiber portions with different core diameters, wherein the fiber portion with the lowest core diameter is near an input end, and the fiber portion with highest core diameter is near an output end.

16. The amplifier according to claim 15, wherein the inner clad is homogeneous along all fiber portions.

17. The amplifier according to claim 15, wherein the composite double clad fiber is pumped by pump sources coupled through the composite fiber ends.

18. The amplifier according to claim 15, wherein the composite double clad fiber is pumped by pump sources coupled by side-coupling along a length thereof.

* * * * *